United States Patent [19]

Rufus et al.

[11] Patent Number: 5,955,521
[45] Date of Patent: Sep. 21, 1999

[54] ULTRA-VIOLET STABILIZED POLYVINYL CHLORIDE RESINS AND METHODS TO IMPART ULTRA-VIOLET STABILIZATION TO POLYVINYL CHLORIDE RESINS

[75] Inventors: Isaac B. Rufus, Newark, Del.; Hao A. Chen, Chadds Ford, Pa.

[73] Assignee: Mannington Mills, Inc., Salem, N.J.

[21] Appl. No.: 08/895,864

[22] Filed: Jul. 17, 1997

[51] Int. Cl.$^6$ .................................................. C08K 5/3432
[52] U.S. Cl. .............................................................. 524/102
[58] Field of Search ............................................. 524/102

[56] References Cited

U.S. PATENT DOCUMENTS 5,710,240  1/1998  Steinmann .............................. 528/289

FOREIGN PATENT DOCUMENTS 2269819  8/1993  United Kingdom .

OTHER PUBLICATIONS

"Additives for Plastics and Coatings: Sanduvor PR–31," *Clariant Technical Bulletin*, 6–147 (1996), pp. 1–16.

"Additives for Coatings: Sanduvor VSU Powder," *Clariant Technical Bulletin*, 2–150 (1996), pp. 1–8.

VP Sanduvor PR–31: Physical Properties.

*Primary Examiner*—Paul R. Michl
*Attorney, Agent, or Firm*—Finnegan, Henderson, Farabow, Garrett, and Dunner, L.L.P.

[57] ABSTRACT

Ultra-violet stabilized polyvinyl resins, such as polyvinyl chloride, are disclosed. The ultra-violet stabilized polyvinyl resins comprise polyvinyl resins and a stabilizer comprising a benzylidene malonic ester of 1,2,2,6,6-pentamethylpiperidinol or its derivatives. The stabilizer can be added to or dispersed within the polyvinyl resins prior to any objects or articles being formed from the resins. Also disclosed is a method to impart ultra-violet stabilization to polyvinyl resins which includes the step of adding to or dispersing within the polyvinyl resins, a stabilizer comprising a benzylidene malonic ester of 1,2,2,6,6-pentamethylpiperidinol or its derivatives. The invention further includes the addition of an ultra-violet absorber such as ethane diamine, n-(2-ethoxyphenyl)-n$^1$-(4-ethyl phenyl) to the polyvinyl resin composition.

31 Claims, 4 Drawing Sheets

ULTRA-VIOLET STABILIZED POLYVINYL CHLORIDE RESINS AND METHODS TO IMPART ULTRA-VIOLET STABILIZATION TO POLYVINYL CHLORIDE RESINS

BACKGROUND OF THE INVENTION

1. Field of the Invention

The present invention relates to the ultra-violet stabilization of polyvinyl resins, such as polyvinyl chloride, and their copolymers and further relates to methods to impart ultra-violet stabilization to polyvinyl resins and products made therefrom.

2. Background of the Invention

Polyvinyl resins, such as polyvinyl chloride, and their copolymers are extremely popular polymers that are used to form a variety of products such as siding, windows, door panels, pipes and cables, and automobile parts. However, there has been a constant effort to impart ultra-violet protection to polyvinyl resins since they are susceptible to deterioration by ultra-violet light. Ultra-violet light causes polyvinyl resins to discolor, chalk, lose gloss, and even to become brittle leading to possible deformation of the product made from the polyvinyl resin and a reduction in physical properties such as tensile strength, impact strength, and elastic modulus.

Ultra-violet light stabilizers have been used with polyvinyl chloride but have not, at times, adequately prevented damage caused by ultra-violet light.

SUMMARY OF THE INVENTION

Accordingly, a feature of the present invention is to provide ultra-violet stabilized polyvinyl resins which provide sufficient ultra-violet protection from ultra-violet light.

Another feature of the present invention is to provide a method to impart ultra-violet stabilization to polyvinyl resins products made from polyvinyl resins.

Additional features and advantages of the present invention will be set forth in part in the description which follows, and in part will be apparent from the description, or may be learned by practice of the present invention. The objectives and other advantages of the present invention will be realized and attained by means of the elements and combinations particularly pointed out in the written description including the drawings and appended claims.

To achieve these and other advantages and in accordance with the purpose of the present invention, as embodied and broadly described herein, the present invention relates to ultra-violet stabilized polyvinyl resins comprising polyvinyl resins and a stabilizer comprising a benzylidene malonic ester of 1,2,2,6,6-pentamethylpiperidinol or its derivatives. The ultra-violet stabilized polyvinyl resins of the present invention can be formed into any object, such as a wear layer which forms part of a surface covering.

The present invention further relates to a method to impart ultra-violet stabilization to polyvinyl resins comprising adding to or dispersing within at least a portion of a polyvinyl resin, a stabilizer comprising a benzylidene malonic ester of 1,2,2,6,6-pentamethylpiperidinol or its derivatives.

It is to be understood that both the foregoing general description and the following detailed description are exemplary and explanatory only and are intended to provide further explanation of the present invention, as claimed.

The accompanying drawings, which are incorporated in and constitute a part of this specification, illustrate one embodiment of the present invention and together with the description, serve to explain the principles of the present invention.

DETAILED DESCRIPTION OF THE PRESENT INVENTION

Figure 1:
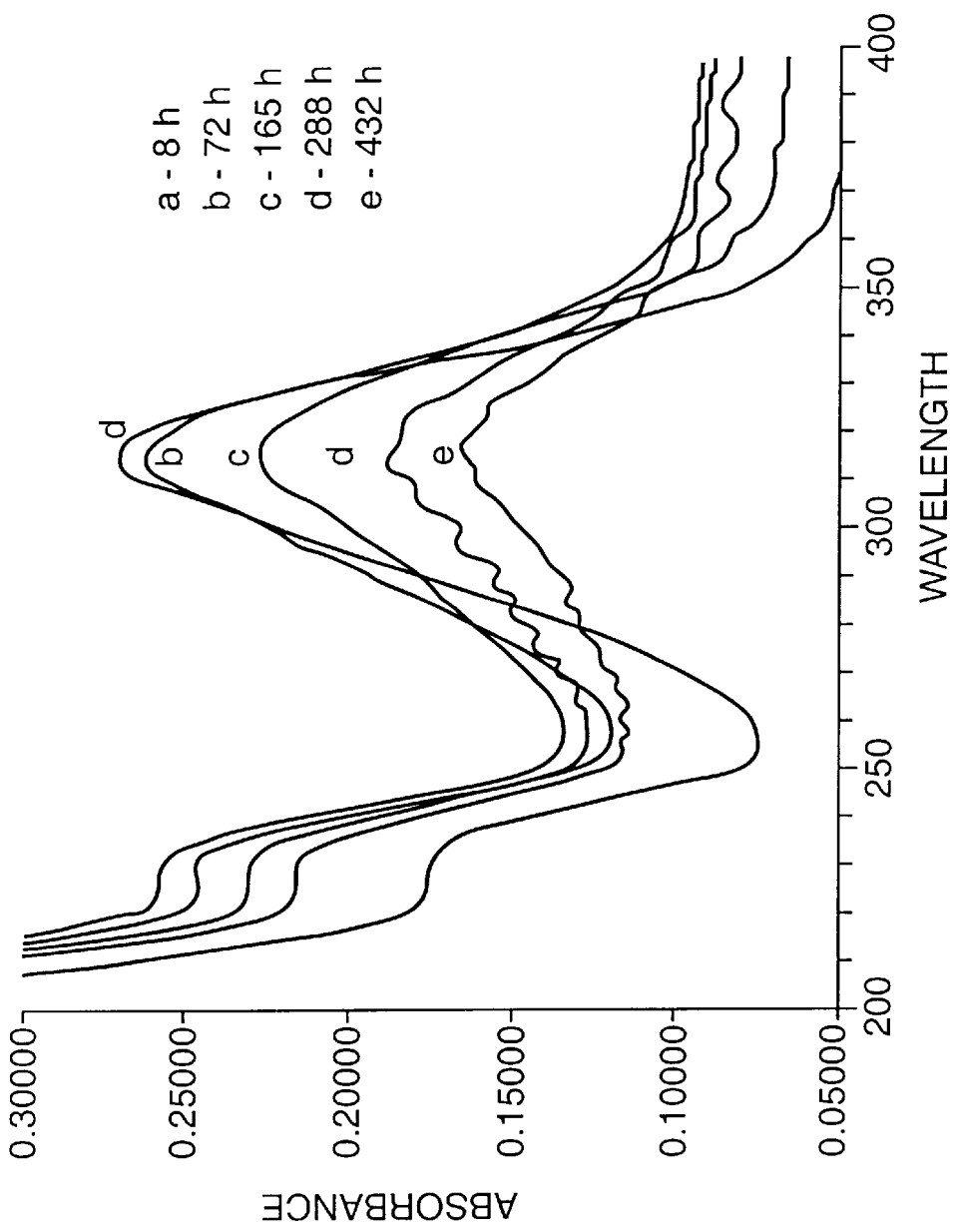
FIG. 1 depicts the UV-absorption spectrum of a polyvinyl chloride film containing 0.8 wt. % of propanedioic acid, [(4-methoxyphenyl)-methylene]-bis(1,2,2,5,6-pentamethyl-4-piperidinyl) ester as a function of photolysis time.

The present invention relates to ultra-violet stabilized resins, such as polyvinyl chloride, The ultra-violet stabilized polyvinyl resins comprise polyvinyl resins and a stabilizer, wherein the stabilizer comprises at least a benzylidene malonic ester of 1,2,2,6,6-pentamethylpiperidinol or its derivatives. The benzylidene malonic ester of 1,2,2,6,6-pentamethylpiperidinol has the following formula:

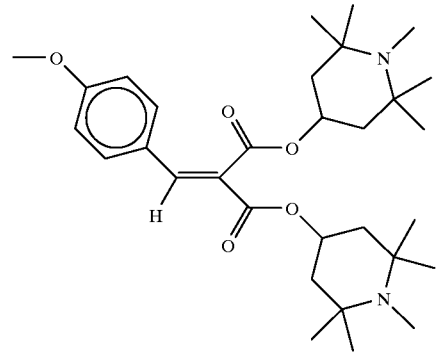

This compound has the molecular formula $C_{31}H_{48}N_2O_5$ and has a molecular weight of 528.8 g/mol and a CAS registry number 147783-69-5. The chemical name of the compound is propanedioic acid, [(4-methoxyphenyl)-methylene]-bis(1,2,2,5,6-pentamethyl-4-piperidinyl) ester. The compound is available commercially under the name SANDUVOR PR-31 which is manufactured by Clariant Huningue SA located in Huningue Cedex, France and marketed in the United States by Clariant Corporation, located in Charlotte, N.C.

The term ultra-violet stabilized polyvinyl resins refers to polyvinyl resins that do not suffer a significant loss in its mechanical, physical, surface or other properties such as clarity, color, elastic modulus, gloss, impact strength, and tensile strength upon exposure to ultra-violet light (UVA, UVB, sunlight, and visible light). Ultra-violet stabilized polyvinyl resins should exhibit both short term and long term stability. The ultra-violet stability is determined by measuring changes in certain properties of the resin such as color (yellowness index), clarity (light transmittance) and by observing the formation of purple spots in the resin. These changes are measured as a function of the exposure time in a weatherometer or other similar device that simulates natural weather conditions.

The benzylidene malonic ester of 1,2,2,6,6-pentamethylpiperidinol or its derivatives can be used alone as the only stabilizer or can be used in combination with other stabilizers such as, but not limited to, UV-absorbers such as oxalic anilides and hydroxybenzotriazoles. When used, the other stabilizers are preferably present in an amount ranging from about 0.02% to about 5% by weight and the ratio of the amount of other stabilizers to the amount of benzylidene malonic ester of 1,2,2,6,6-pentamethylpiperidinol or its derivatives is about 2:1.

The benzylidene malonic ester of 1,2,2,6,6-pentamethylpiperidinol or its derivatives can be dispersed throughout or added to the polyvinyl resins, or a portion thereof. Alternatively, or in combination, the benzylidene malonic ester of 1,2,2,6,6-pentamethylpiperidinol or its derivatives can be coated onto the polyvinyl resins.

The benzylidene malonic ester of 1,2,2,6,6-pentamethylpiperidinol or its derivatives can be dispersed within the polyvinyl resins by any means known to those skilled in the art such as extrusion or mixing. Similarly, when applying the benzylidene malonic ester of 1,2,2,6,6-pentamethylpiperidinol or its derivatives as a coating, it can be accomplished by any means known to those skilled in the art, including, but not limited to spray coating, powder coating, radiation curing, and roll coating.

The benzylidene malonic ester of 1,2,2,6,6-pentamethylpiperidinol or its derivatives can be dispersed within the polyvinyl resins prior to an object being formed with the polyvinyl resins. Objects which can be made from polyvinyl resins and protected by the benzylidene malonic ester of 1,2,2,6,6-pentamethylpiperidinol or its derivatives, alone or in combination with UV-absorbers, include, but are not limited to, piping and conduits of all kinds, siding, gutters, windows and door frames, raincoats, toys, gaskets, hoses, electrical insulation, shoes, magnetic tape, film and sheeting, containers for toiletries, cosmetics, household chemicals, fibers for athletic supports, sealant liners for ponds and reservoirs, adhesive and bonding agents, plastisols and organosols, tennis court playing surfaces, flooring, coating for paper and textiles, wire and cable protection, base for synthetic turf, phonograph records, automobile windshields and other automobile parts, and upholstery.

As a particular example, the benzylidene malonic ester of 1,2,2,6,6-pentamethylpiperidinol or its derivatives can be used with all types of surface coverings such as wallpaper and floor coverings. With regard to floor coverings, the benzylidene malonic ester of 1,2,2,6,6-pentamethylpiperidinol or its derivatives can be added to polyvinyl resins which form a wear layer. The wear layer forms part of a floor covering. The structure and design of one type of surface covering is set forth in U.S. Pat. No. 4,756,951, which is incorporated in its entirety herein by reference.

When the benzylidene malonic ester of 1,2,2,6,6-pentamethylpiperidinol or its derivatives is dispersed within or added to the polyvinyl resins, generally, a sufficient amount is dispersed therein to provide substantial protection against ultra-violet light degradation. Preferably, the amount of benzylidene malonic ester ranges from about 0.02% to about 5% by weight; most preferably ranges from about 0.05% to about 2% by weight.

As stated earlier, the present invention also involves a method to impart ultra-violet stabilization to polyvinyl resins, such as polyvinyl chloride, or objects made from polyvinyl resins. This protection can be imparted by dispersing or adding the benzylidene malonic ester of 1,2,2,6,6-pentamethylpiperidinol or its derivatives into the polyvinyl resins at the time that an object is formed from the polyvinyl resins.

When the polyvinyl resins are in the form of a powder, the benzylidene malonic ester of 1,2,2,6,6-pentamethylpiperidinol or its derivatives can be mixed with the powders of polyvinyl resins by mixing using procedures well known in the art. In the case of plastisols or organosols, the benzylidene malonic ester of 1,2,2,6,6-pentamethylpiperidinol of its derivatives is added to the mixture of liquids or plasticizers and stirred well by means of a mechanical mixer. The powders of polyvinyl resins are then added to the liquid mixture and are mixed well to ensure uniform distribution of the stabilizer.

The present invention will be further clarified by the following examples, which are intended to be purely exemplary of the present invention.

EXAMPLE 1

0.8 wt % of propanedioic acid, [(4-methoxyphenyl)-methylene]-,bis(1,2,2,5,6-pentamethyl-4-piperidinyl) ester and polyvinyl chloride with an inherent viscosity of 1.2 were dissolved in tetrahydrofuran and films with a thickness of 0.5 to 1.0 mil were cast from the solution and the tetrahydrofuran was allowed to evaporate in the dark for 2–4 days. Ultra-violet spectrum of a free standing polyvinyl chloride film thus obtained was recorded as a function of exposure time to 340 nm fluorescent lamps in a HPUV-3 Actinic Exposure System. As shown in FIG. 1, as a function of exposure time, the optical density or absorbance at 310 nm decreases, indicating the photografting of propanedioic acid, [(4-methoxyphenyl)-methylene]-bis(1,2,2,5,6-pentamethyl4-piperidinyl) ester to polyvinyl chloride. Further chemical analysis was performed to determine the amount of stabilizer contained in the composition after exposure time ranging from no exposure to 432 hours. Unexposed film (a) contained 0.79 wt % of propanedioic acid, [(4-methoxyphenyl)-methylene]-bis(1,2,2,5,6-pentamethyl-4-piperidinyl) ester to polyvinyl chloride and the film exposed for 4:32 hours (e) contained 0.19 wt % of the stabilizer. This result confirms the photografting of propanedioic acid, [(4-methoxyphenyl)-methylene]-bis(1,2,2,5,6-pentamethyl-4-piperidinyl) ester to polyvinyl chloride.

EXAMPLE 2

This example investigated the effect of the choice of light stabilizer on the ultra-violet stability of polyvinyl chloride. In this example, three different compositions were formulated. Comparative composition A was an unstabilized polyvinyl chloride composition. Comparative composition B was a polyvinyl chloride stabilized with a prior art stabilizer. Composition C was a polyvinyl chloride composition prepared according to the present invention.

Comparative composition A consisted of the following:

| | |
|---|---|
| dipropylene glycol dibenzoate | 10.7 phr* |
| benzyl butyl phthalate | 20.9 phr |
| mixture of $C_{10}$–$C_{16}$ organic hydrocarbons | 5.9 phr |
| 2,2,4-trimethyl-1,3-pentanediol diisobutyrate | 4.1 phr |
| mixture of epoxidized soybean oil, zinc phosphites and hydrocarbons | 7.3 phr |

*phr = parts per hundred parts resin

A mixture of polyvinyl chloride resins with an inherent viscosity of 1.2 to 1.4 were used in the above formulation.

Comparative composition B consisted of polyvinyl chloride mixed with 0.70 phr of a ultra-violet absorber comprising a mixture of oxalic anilide derivatives such as ethane diamide, n-(2-ethoxyphenyl)-n$^1$-(4-ethylphenyl) and 0.36 phr of a conventional hindered amine light stabilizer (HALS) bis-(1-octyloxy-2,2,6,6-tetramethyl-4-piperidinyl) sebacate.

Composition C according to the present invention consisted of polyvinyl chloride mixed with 0.70 phr of a ultra-violet absorber comprising a mixture of oxalic anilide derivatives such as ethane diamide, n-(2-ethoxyphenyl)-n$^1$-(4-ethylphenyl) and 0.36 phr of propanedioic acid, [(4-methoxyphenyl)-methylene]-bis(1,2,2,5,6-pentamethyl-4-piperidinyl) ester.

The plastisols thus formulated according to compositions A, B, and C were cast onto a floor covering construction and fused at about 400° F. for 4–5 minutes to form a 19–21 mil polyvinyl chloride wear layer. Then this polyvinyl chloride wear layer was coated with a 0.9–1.3 mil film of radiation curable urethane based acrylates. The following tests were performed on all three floor covering samples.

HPUV test: Test samples were exposed to 340 nm fluorescent light for 2 weeks and aged at 150° F. for 4 hours. The difference in yellowness index ($\Delta$YI) was measured and the results are contained in Table 1 below.

Direct Sun Test: The samples were exposed to direct sunlight at a 45° angle for 2 hours between 11 am–2 pm on a sunny day. The difference in yellowness index ($\Delta$YI) was measured and the results are contained in Table 1 below.

Weatherometer Test: Samples were exposed in a Xenon Weatherometer for 400 hours (dry cycle) and heat aged at 150° F. for 4 hours. The difference in yellowness index ($\Delta$YI) was measured and the results are contained in Table 1 below.

TABLE I

| Polyvinyl chloride Sample | HPUV Test ($\Delta$YI) | Direct Sun Test ($\Delta$YI) | Weatherometer Test ($\Delta$YI) |
|---|---|---|---|
| Comparative Composition A (unstabilized) | 4.41 | −2.71 | 7.77* |
| Comparative Composition B (prior art stabilizers) | −0.74 | −1.38 | −3.06 |
| Composition C according to the present invention | 0.0 | −1.75 | 0.37 |

*This sample developed purple spots and a brown color.
$\Delta$YI = difference in yellowness index The yellowness index is a measure of the departure from achromatic to yellow of a given resin sample. The index starts at zero and increases as yellowness increases. Thus, the higher the $\Delta$YI, the greater the amount of yellowing that has occurred. A negative number represents that bleaching has occurred.

EXAMPLE 3

This example compared the ultra-violet stabilization of polyvinyl chloride containing prior art hindered amine stabilizers (HALS) with polyvinyl chloride containing propanedioic acid, [(4-methoxyphenyl)-methylene]-bis(1,2,2,5,6-pentamethyl-4-piperidinyl) ester according to the present invention.

Comparative composition B of Example 2 was used as the HALS containing composition and Composition C prepared in Example 2 was again used to represent the composition according to the present invention. In this example, free standing 17–19 mil flexible polyvinyl chloride films were used. The films were prepared by fusing each composition at 400° F. for 4–5 minutes.

These films were subjected to the Weatherometer Test described above in Example 2. The samples were exposed for increasing lengths of time and the difference in yellowness index ($\Delta$YI) was measured at various time intervals. The samples were also observed to determine the severity of purple spot formation. The results of the test are set forth in Table II below.

TABLE II

| Exposure | Difference in Yellowness Index | | Severity of Purple Spot Formation* | |
|---|---|---|---|---|
| Time (Hours) | Comparative Composition B | Composition C | Comparative Composition B | Composition C |
| 100 | −1.18 | −0.70 | 0 | 0 |
| 400 | 0.34 | −0.96 | 1 | 0 |
| 800 | 1.46 | −0.48 | 2 | 0 |
| 1200 | 3.91 | 0.80 | 3 | 0 |
| 1600 | 5.16 | 1.40 | 4 | 0 |
| 2000 | 6.81 | −1.01 | 5 | 2 |

*The higher the number the higher the number of purple spots formed.

As shown in Table II, the difference in yellowness index was much greater for the prior art composition (B) as compared to the difference for the composition according to the present invention (C). This demonstrates that the composition according to the present invention provides superior ultra-violet stabilization as compared to the prior art stabilizers. Table II also illustrates that the composition according to the present invention provides much better protection against yellowing or discloration and purple spot formation than the prior art stabilizers.

EXAMPLE 4

Vinyl floor coverings were made according to methods well known in the art using Comparative composition B according to Example 2 above and Composition C according to the present invention also prepared in Example 2. The vinyl floor covering consisted of a polyvinyl chloride wear layer having a thickness of 19–21 mil which was coated with a urethane based acrylate layer having a thickness of 0.9–1.1 mil. In both cases, one half of the floor covering was exposed to sunlight for 25 hours and the other half was not exposed to sunlight. The yellowness index was measured for both the exposed and unexposed areas on each floor covering and the difference in yellowness index between the exposed and unexposed areas was calculated. The results are set forth in Table III below.

TABLE III

| Composition | Yellowness Index of Unexposed Surface | Yellowness Index of Exposed Surface | Difference in Yellowness Index (ΔYI) |
| --- | --- | --- | --- |
| Comparative Composition B | 13.1 | 10.5 | 2.6 |
| Composition C according to the present invention | 11.9 | 11.0 | 0.9 |

It is clear from Table III that the difference in yellowness index between the exposed and unexposed portions of the sample floor coverings is much lower for the composition according to the present invention as compared to the prior art composition. Thus, the composition according to the present invention provides better ultra-violet stabilization than the prior art composition.

Figure 2:
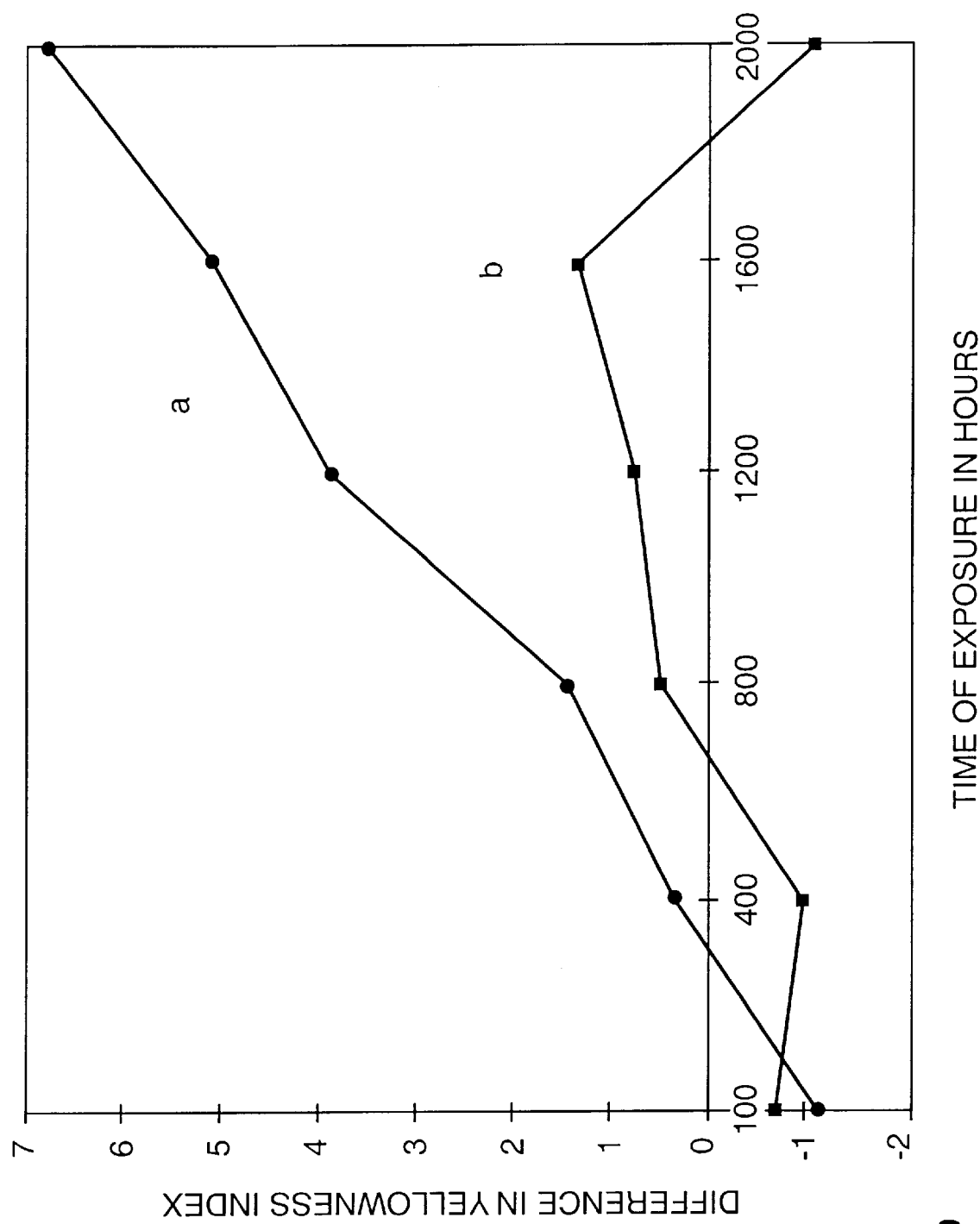
FIG. 2 depicts the change in yellowness index ($\Delta$YI) of (a) polyvinyl chloride films stabilized with conventional stabilizers and (b) polyvinyl chloride films which are stabilized according to the present invention as a function of exposure time to a Xenon Weatherometer.
Figure 3:
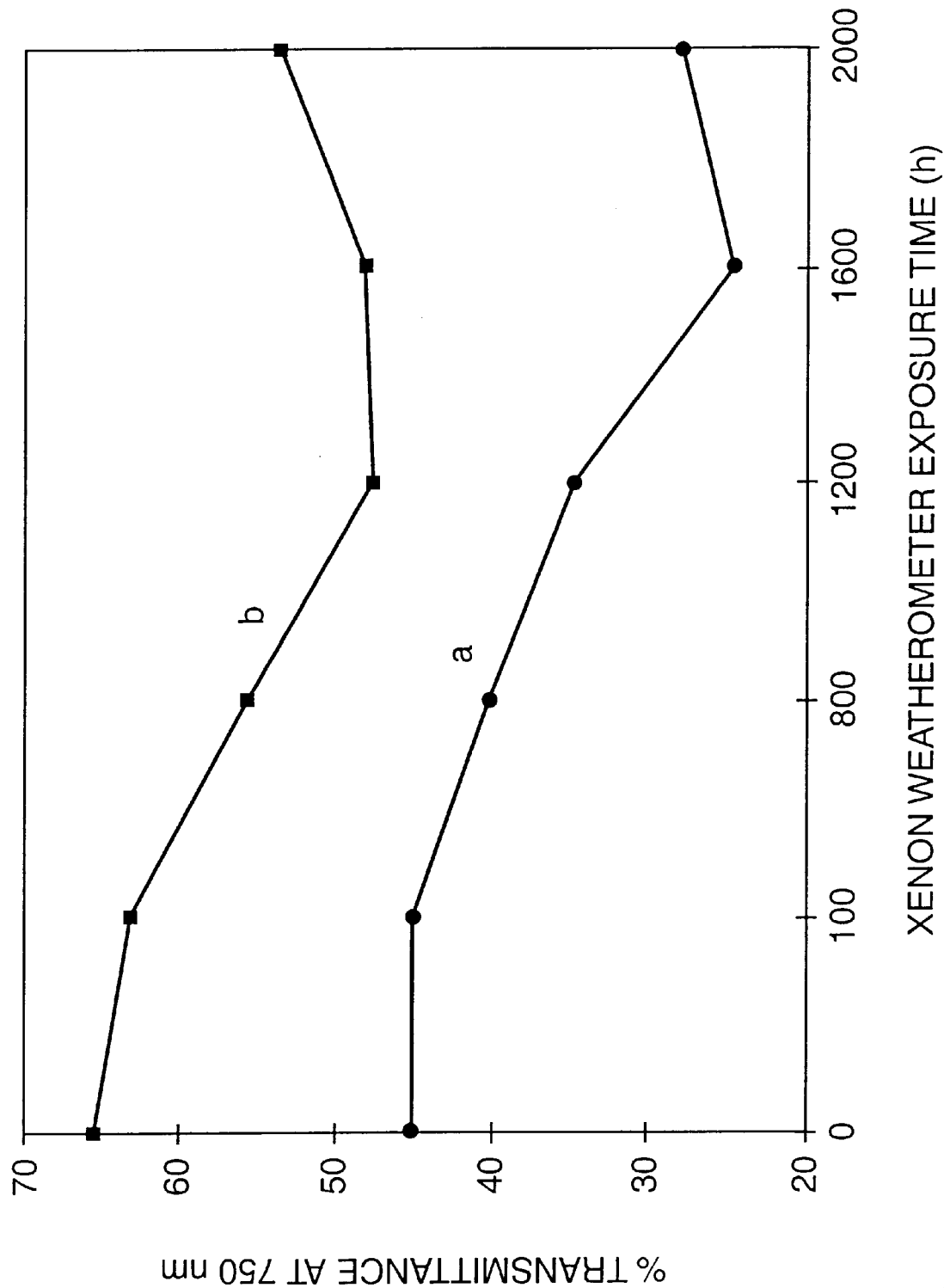
FIG. 3 depicts the percentage transmittance (clarity) of (a) polyvinyl chloride films stabilized with conventional stabilizers and (b) polyvinyl chloride films which are stabilized according to the present invention as a function of exposure time to a Xenon Weatherometer.
Figure 4:
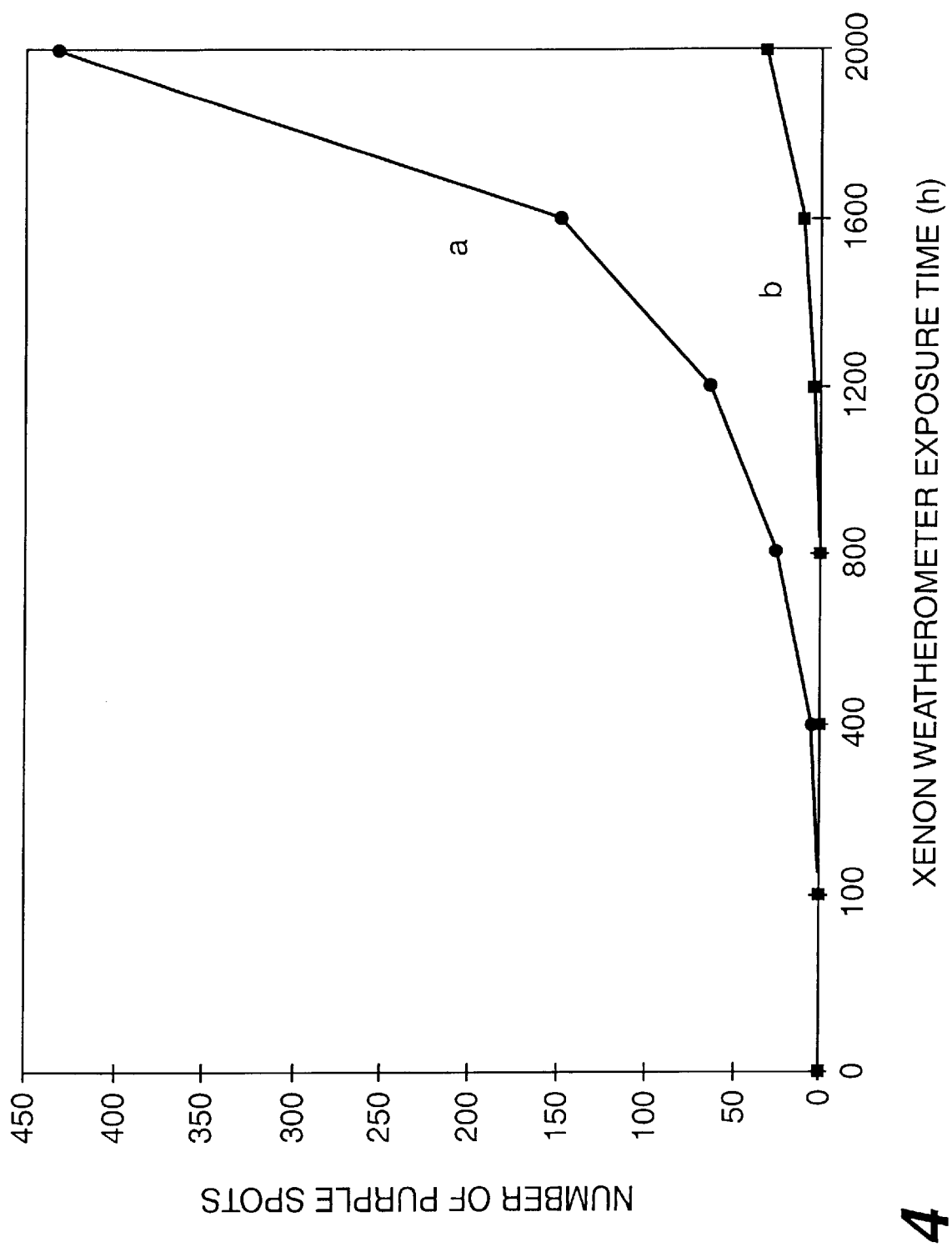
FIG. 4 depicts the number of purple spots formed on (a) polyvinyl chloride films stabilized with conventional stabilizers and (b) polyvinyl chloride films which are stabilized according to the present invention as a function of exposure time to a Xenon Weatherometer.

As shown in the above Examples and in FIGS. 2, 3 and 4, the composition according to the present invention provides superior ultra-violet stabilization, superior protection against purple spot formation, good color stability, and good clarity as compared to ultra-violet stabilizers known in the art.

Other embodiments of the present invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An ultra-violet stabilized polyvinyl resin comprising polyvinyl chloride resin and a stabilizer comprising a benzylidene malonic ester of 1,2,2,6,6-pentamethylpiperidinol or its derivatives and ethane diamine, n-(2-ethoxyphenyl)-n$^1$-(4-ethyl phenyl).

2. The ultra-violet stabilized polyvinyl resin of claim 1, wherein said stabilizer is dispersed throughout at least a portion of said polyvinyl chloride resin.

3. The ultra-violet stabilized polyvinyl resin of claim 1, wherein said stabilizer is a coating in contact with at least a portion of said polyvinyl chloride resin.

4. The ultra-violet stabilized polyvinyl resin of claim 1, wherein said ethane diamine, n-(2-ethoxyphenyl)-n$^1$-(4-ethyl phenyl) is present in an amount ranging from about 0.02 to about 5 wt %.

5. The ultra-violet stabilized polyvinyl resin of claim 1, wherein the ratio of the amount of the ethane diamine, n-(2-ethoxyphenyl)-n$^1$-(4-ethyl phenyl) to the amount of the benzylidene malonic ester of 1,2,2,6,6-pentamethylpiperidinol or its derivatives is about 2:1.

6. The ultra-violet stabilized polyvinyl resin of claim 1, wherein said polyvinyl resin is a wear layer forming a part of a surface covering.

7. The ultra-violet stabilized polyvinyl resin of claim 6, wherein said surface covering is a floor covering.

8. The ultra-violet stabilized polyvinyl resin of claim 1, wherein said polyvinyl resin is a wear layer forming a part of a surface covering.

9. The ultra-violet stabilized polyvinyl resin of claim 8, wherein said surface covering is a floor covering.

10. The ultra-violet stabilized polyvinyl resin of claim 1, wherein said stabilizer is present in an amount ranging from about 0.02 wt % to about 5 wt %.

11. The ultra-violet stabilized polyvinyl resin of claim 7, wherein said stabilizer is present in an amount of from about 0.02 wt % to about 5 wt %.

12. The ultra-violet stabilized polyvinyl resin of claim 9, wherein said stabilizer is present in an amount ranging from about 0.02 wt % to about 5 wt %.

13. An object or article formed from the ultra-violet stabilized polyvinyl resin of claim 1.

14. A method to impart ultra-violet stabilization to a polyvinyl chloride resin comprising the step of adding to or dispersing within said polyvinyl chloride resin a stabilizer comprising a benzylidene malonic ester of 1,2,2,6,6-pentamethylpiperidinol or its derivatives and ethane diamine, n-(2-ethoxyphenyl)-n$^1$-(4-ethyl phenyl).

15. The method of claim 14, wherein said stabilizer is dispersed throughout at least a portion of the polyvinyl chloride resin.

16. The method of claim 14, wherein said stabilizer is applied onto at least a portion of the polyvinyl chloride resin.

17. The method of claim 14, wherein said stabilizer is dispersed within said polyvinyl resin in an amount ranging from about 0.02 wt % to about 5 wt %.

18. The method of claim 16, wherein said stabilizer is applied onto said polyvinyl resin in an amount ranging from about 0.02 wt % to about 5 wt %.

19. The method of claim 14, wherein said polyvinyl resin is a wear layer forming a part of a surface covering.

20. The method of claim 19, wherein said surface covering is a floor covering.

21. The method of claim 14, further comprising the step of forming an article or object from said polyvinyl resin.

22. A method to impart ultra-violet stabilization to polyvinyl chloride resin comprising the step of adding to or dispersing within said polyvinyl chloride resin a stabilizer comprising a benzylidene malonic ester of 1,2,2,6,6-pentamethylpiperidinol or its derivatives and ethane diamine, n-(2-ethoxyphenyl)-n$^1$-(4-ethyl phenyl).

23. The method of claim 22, wherein said stabilizer is dispersed throughout at least a portion of the polyvinyl resin.

24. The method of claim 22, wherein said stabilizer is applied onto at least a portion of the polyvinyl resin.

25. The method of claim 23, wherein said stabilizer is dispersed within said polyvinyl resin in an amount ranging from about 0.02 wt % to about 5 wt %.

26. The method of claim 24, wherein said stabilizer is applied onto said polyvinyl resin in an amount ranging from about 0.02 wt % to about 5 wt %.

27. The method of claim 22, wherein said polyvinyl resin is a wear layer forming a part of a surface covering.

28. The method of claim 27, wherein said surface covering is a floor covering.

29. The method of claim 22, further comprising the step of forming an article or object from said polyvinyl resin.

30. The method of claim 22, wherein said ethane diamine, n-(2-ethoxyphenyl)-n$^1$-(4-ethyl phenyl) is present in an amount ranging from about 0.02 to about 5 wt %.

31. The method of claim 20, wherein the ratio of the amount of the ethane diamine, n-(2-ethoxyphenyl)-n$^1$-(4-ethyl phenyl) to the amount of the benzylidene malonic ester of 1,2,2,6,6-pentamethylpiperidinol or its derivatives is about 2:1.

* * * * *